Sept. 7, 1937.  R. E. FERRIS  2,092,058
FIELD COIL FOR MOTORS
Filed Nov. 28, 1936
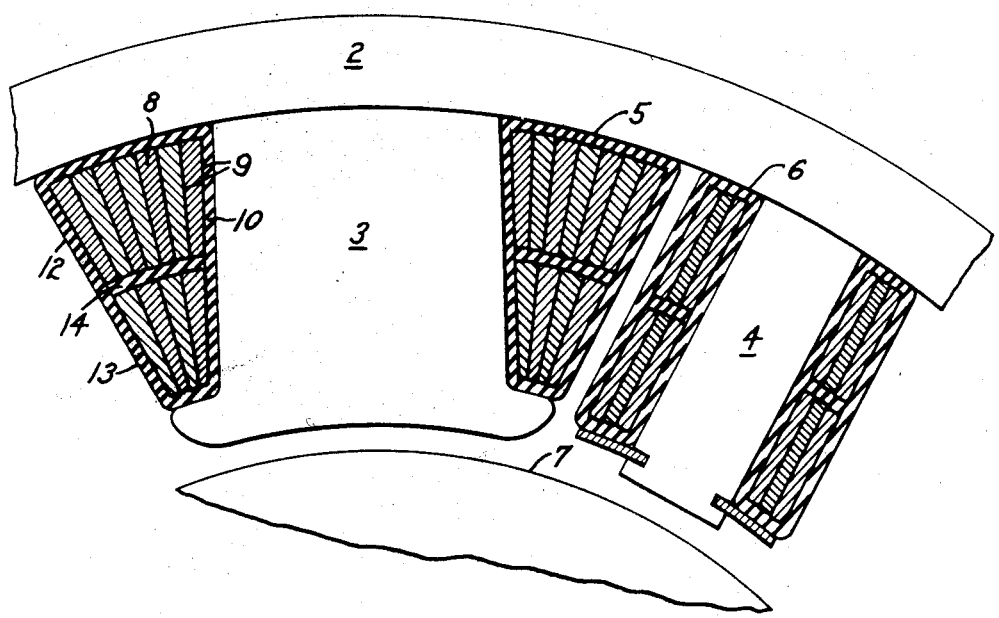
WITNESSES:
Wm. B. Sellers.
Nm. C. Groome
INVENTOR
Ralph E. Ferris.
BY O. B. Buchanan
ATTORNEY Patented Sept. 7, 1937

2,092,058

UNITED STATES PATENT OFFICE 2,092,058

FIELD COIL FOR MOTORS

Ralph E. Ferris, Wilkinsburg, Pa., assignor to Westinghouse Electric & Manufacturing Company, East Pittsburgh, Pa., a corporation of Pennsylvania Application November 28, 1936, Serial No. 113,176

2 Claims. (Cl. 171—252)

My invention relates to field-coils for salient-pole dynamo-electric machines, and it has particular relation to special-configuration field-coils for driving or traction motors for railway and motor-coach service.

An object of the invention is to conserve the available space between the armature and the field-frame or yoke of a direct-current traction motor, so as to make it possible to reduce the radial extent of this space, thus bringing the field-frame closer to the armature and reducing the size and weight of the motor, while at the same time causing the field-coils to fit more closely against the field-frame member so as to avoid dead-air pockets and to facilitate the transfer of heat from the coil to the frame-member.

The conservation of traction-motor weight, or the ability to obtain the same or greater horse power out of a lighter weight of motor, is an extremely important item in all self-propelled vehicles, and particularly in buses such as trolley buses, where the vertical space available underneath the floor of the vehicle is limited, so that a reduction in the size of the motor may make the difference between a two-motor bus and a single-motor bus. Furthermore, the difference between a two-motor bus and a single-motor bus may be that the single-motor bus is so similar to a gasoline-driven bus that it may be produced on the same manufacturing "line" as a gasoline-driven bus, whereas the two-motor bus cannot be manufactured in this way because it is so special.

The particular object of my invention is to make a field coil, utilizing wedge-shaped strap-copper or tapered copper straps, whereby the coil as a whole nests snugly against the inner surface of the cylindrical frame-member substantially without dead-air spaces, and whereby the coil as a whole tapers down, in cross-section, from a maximum width at its outer periphery to a minimum width at its inner periphery, thereby more completely utilizing the available space between the armature and the cylindrical frame-member of the motor.

In the accompanying drawing, the single figure of which is a somewhat diagrammatic fragmentary cross-sectional view of a motor embodying my invention in a preferred form, the motor comprises a salient-pole stator-member which is made up of a magnetizable cylindrical frame or yoke-member 2, salient magnetizable main-pole and commutating-pole, members 3 and 4, main field coils 5, and commutating pole coils 6. The motor also has an armature member, the outer periphery of which is indicated at 7.

According to my invention, at least some of the field-coil members, either the main field-coils 5 or the commutating field-coils 6, or both of them, are specially constructed in order to conserve space and to facilitate heat-transfer from the coils to the cylindrical frame member 2.

In the particular embodiment of my invention shown in the drawing, the main field-coils 5 are specially constructed, being wound with wedge-shaped conducting straps 8, that is, with copper straps having a tapered cross-section, the wide end of the cross-section being toward the cylindrical frame-member 2. Each of the conducting straps is provided with a light insulation 9, so as to insulate the several turns from each other, and the whole coil is provided with a thicker outside insulation 10 for the purpose of insulating the coil from the magnetizable frame-parts 2 and 3.

It will be perceived that the utilization of wedge-shaped conducting straps 8 causes the outer periphery of the coil to be curved, so as to fit snugly against the inner surface of the cylindrical frame-member 2, thereby fully utilizing all of the available space, so as to reduce the size of the motor, while at the same time avoiding the presence of a dead-air space between the said outer periphery of the coil 5 and the inner periphery of the cylindrical frame-member 2, thereby facilitating heat-transfer from the coil to the frame, and thus still further reducing the size of the motor for a given output.

Preferably each of the pole-pieces 3 carrying my improved field-coils is provided with a plurality of coils 12 and 13, each coil being composed of a single layer of the wedge-shaped copper straps 8. The outer coil 12 thus nests snugly against the inner surface of the cylindrical frame-member 2 as described, and the inner coil 13 rests snugly against the inner periphery of the outer coil, with insulation 14 therebetween. In this form of construction, the inner coil has a smaller number of turns than the outer coil, but the same size of copper strap, so that the maximum width of the inner coil will be about the same as the minimum width of the outer coil, thus causing the outer configuration of the two coils as a whole to be a tapered or trapezoidal-shaped configuration, effectively utilizing the available space of the stator-member of the motor. Usually, the two coils will be bound together in a single unit by means of a single encompassing outer insulating covering 10.

I claim as my invention:

1. A salient-pole stator-member for a dynamo-electric machine characterized by a cylindrical frame-member, salient-pole members extending inwardly therefrom, and coils disposed on certain of the salient-pole members, each of said coils comprising a plurality of turns of wedge-shaped conducting straps suitably insulated from adjacent turns and from the frame and pole-members, whereby each coil as a whole nests snugly against the inner surface of the cylindrical frame substantially without dead-air spaces.

2. A salient-pole stator member for a dynamo-electric machine characterized by a cylindrical frame-member, salient-pole members extending inwardly therefrom, and coils disposed on certain of the salient-pole members, each of said certain pole-members carrying a plurality of coils, one coil being disposed against the inner surface of the cylindrical frame-member, and another coil being disposed against the opposite side of the first-mentioned coil, each of said coils comprising a plurality of turns of wedge-shaped conducting straps suitably insulated from adjacent turns and from the frame and pole-members, whereby the first-mentioned coil nests snugly against the inner surface of the cylindrical frame substantially without dead-air spaces, and whereby the second-mentioned coil nests snugly against the inner side of the first-mentioned coil, the second-mentioned coil having a smaller number of turns than the first-mentioned coil whereby the available space of the motor is more effectively utilized.

RALPH E. FERRIS.